US004001751B2

United States Statutory Invention Registration [19]

[11] Reg. Number: H1751

Pereira [45] Published: Oct. 6, 1998

[54] HIGH-G TELEMETRY CONTROLLER

[75] Inventor: Carlos M. Pereira, Tannersville, Pa.

[73] Assignee: The United States of America as represented by the Secretary of the Army, Washington, D.C.

[21] Appl. No.: 409,461

[22] Filed: Mar. 20, 1995

[51] Int. Cl.[6] ..... G08C 19/16; F41G 7/00; F42B 19/00

[52] U.S. Cl. ..... 340/870.01; 244/3.12; 114/21.2

*Primary Examiner*—Daniel T. Pihulic
*Assistant Examiner*—Theresa M. Wesson
*Attorney, Agent, or Firm*—Anthony T. Lane; Edward Goldberg; Michael Sachs

[57] ABSTRACT

Remote telemetry control in the testing of multiple projectiles such as rockets, simultaneously fired, in an environment requiring extremely low power dissipation in the inactive state and experiencing extremely high-G accelerations during launch. On-board battery charging, battery and telemeter conditioning and telemeter control are remotely effected in a highly reliable manner through interfacing a portion of which is on board each projectile and another portion of which is remote from the projectiles and also remotely controlled for safety reasons. The aforementioned on-board functions are prioritized to accomplish first the charging and conditioning requirements, whereby telemeter activation during same is prevented, and the control signals governing charging, conditioning and telemeter operation are electronically isolated to prevent spurious activation. Electronic switching circuitry is incorporated to protectively ensure deactivation of the telemeter during higher priority operations.

17 Claims, 11 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH-G TELEMETRY CONTROLLER

BACKGROUND OF THE INVENTION

The invention relates to remote telemetry control and more particularly to telemetry control in the testing of projectiles experiencing extremely high-G accelerations, where extremely low power dissipation requirements are involved.

Examples of such projectiles are munitions rockets associated with multiple rocket launchers. In a typical testing environment to ascertain the performance of new or modified munitions designs, perhaps twenty-five to thirty, or more such rockets are loaded into a single launcher, for simultaneous or rapid fire launch.

These projectiles possess "on-board" micro-processing capability which renders them "smart", i.e. capable of highly guided dynamics to target. It is essential for proper evaluation that the telemetry circuit conditions, such as power supply parameters and circuit temperatures, be maintained within the physical and design limitations in order to assure accurate and valid telemetry and analysis of the munitions. Given that each test round has associated with it a very considerable expense, it is equally essential to minimize the "wasting" of rounds and launchers.

The individual testing of single projectile launchers or the launch of only a few rockets at a time (or in salvo) greatly would add to the expense of the testing phase, as well as fail to provide the proper and actual multiple-round launch environment for which the test projectiles are being designed.

Heretofore, the test projectile rounds were provided with telemetry circuitry intended to transmit, during launch, various parameters of projectile performance, such as acceleration/deceleration, spin, yaw and pitch, etc. By virtue of the nature of the projectiles, including especially their relatively limited internal available space, each round has only a correspondingly limited battery power capability, typically fifteen minutes of useful life, enabling telemetry operation.

Prior to the invention, the battery power to the telemeter had to be turned on via a screw driver switch adjustment, typically located in the warhead section of the projectile or round itself.

While testing of new or modified projectile designs would not ordinarily require inclusion of an armed warhead, the rounds do possess the explosive (i.e., gun powder) launch capability.

The manual activation arrangement of each round thus required the testing engineer or other personnel to physically be present at the launch site to activate the telemeter circuitry, i.e., apply power thereto. As there is a certain amount of time required to turn the telemetry circuitry on for each round in the launcher, it was not practical to test a series of twenty or thirty rockets together, since the time loss due purely to activation was sufficiently large to have essentially exhausted battery power in the earliest activated rounds, by the time the telemetry in the final rounds is activated.

In addition, the presence of human personnel physically at the immediate launch site and requiring "hands-on" engagement with the rounds presented potentially severe safety problems which could not be overcome simply by effecting fail-safe measures.

SUMMARY OF THE INVENTION

What is needed is to have an arrangement whereby the individual rounds in a multi-round test could all have remote turn-on of the power to the telemetry and more specifically a simultaneous telemetry activation of all the test rounds.

It is thus a principal object of this invention to provide a remote control capability to "condition" and operate the telemetry link until the time when the weapon is fired. The major role of the invention is to provide a highly reliable control of the telemetry link which resolves the safety issues at the proving grounds and provides a ready telemetry link at the touch of a button.

The environment described above is prone to the generation of spurious pulses and signals, which if not subject to some form of credence checking mechanism or arrangement, could inadvertently activate power to the telemetry circuits of some or all of the loaded test rounds at inopportune times. It is thus essential that when providing remote telemeter activation capability, any accidental triggering of the arrangement be avoided.

It is, therefore, another object of the invention to have power turn-on optically coupled as to control signals, with the design being such as to prevent accidental application of power to the telemetry.

The military specifications on the projectiles under design are such as to require extremely low-power dissipation to preserve "shelf-life". At the same time, the electronics which have to cope with such requirements must also be able to sustain extremely high-G conditions commensurate with projectile launch.

It is thus a further objective of this invention provide the telemetry remote control arrangement which meets the severe low power operation and dissipation military requirements and at the same time is capable of sustaining the tremendous accelerations experienced with projectile launch.

According to the invention, there is provided remotely controlled multiple-projectile telemeter interfacing, of battery charging, battery and telemeter parameter conditioning and telemeter control within the projectiles during a period extending from pre-launch through post-launch, in at least part of which period extremely high projectile acceleration gradients are experienced, comprising an interface within each projectile for providing remotely generated control signals to the projectile telemeter free from spurious triggering and interference, and a priority arrangement for remotely governing through said interface the battery charging and battery and telemeter conditioning within a multiplicity of projectiles virtually simultaneously, and for inhibiting the receipt by the respective projectile telemeters of control signals during the charging and conditioning.

Moreover, according to the invention, there is provided a noise and interference immuned remote controlled electronic switch, comprising optocoupler input circuitry responsive to both positive and negative polarity signals of predetermined minimum amplitude received from a common input, coupled to latch means structured to provide one possible output state for a given input from the optocoupler circuitry.

In order to provide adequate safety to personnel, it is imperative to have the telemetry activation controls a relatively safe distance from the projectile launch pad or area. This has been empirically determined to be at least one thousand feet. Yet, it is essential not to have power losses sustained in the control leads running to the launch site which such a large distance would inherently provide, particularly under the requisite low power circuitry conditions. Such power losses tend to defeat the credence arrangement incorporated into the overall control arrangement to prevent spurious activation.

What is needed is to provide an "unmanned" control mechanism sufficiently close to the launch site, say 50 feet away, to avoid excessive line power losses, which control is operatively connected to a manned control center the requisite safety distance away from the launch site.

It is, therefore, another important object of this invention to provide a first manned module at said safe distance from the launch site which is electronically coupled to a second and unmanned control module, which in turn provides the needed power to the launch site and the control signals.

Here, again, however, severe military specifications play an important part. The constraints upon the remote control signals are such that the launch area must be accessible only through a four-wire system. Two of these wires are necessary to provide power to the launch site, leaving the other pair of wires to provide all the control signals.

It is important to realize that functions beyond the principal purpose of turning-on, i.e., applying battery power to, the telemetry, are essential to ensure proper operation and successful telemetering of each round. Since the circuit design required by the military specifications must have voltage/current stabilized conditions, it is essential that the batteries intended to deliver stable voltage to the telementry be themselves stabilized in temperature, since it is well known that battery temperature is a primary parameter of battery output stability/instability. Additionally, the telemetry circuitry and the on-board microprocessors themselves are required to be temperature stabilized. Finally, it is important to keep the batteries sufficiently charged and ready.

It is thus required that the control functions of battery charging and temperature control of the batteries and circuitry be added to telementry activation, and all such signals have to be transmitted to each test projectile simultaneously over a single pair of wires.

It is thus a further principal object of the invention to effect a remote control arrangement providing the multiple functions of telementry activation, battery charging and temperature stabilization over a single pair of control lines.

According to the invention there is provided a module on-board each test projectile capable of extremely low power dissipation operation which is operable in extremely high-G environments. This module is electronically isolated from the actual telemetry and micro-processor circuitry through optical coupling and provides the controlled activation of not only the telementry but the on-board battery charging and battery/on-board electronics temperature stabilization.

The on-board module of each round is electrically connected via an umbilical arrangement to the unmanned remote control module which provides the pre-launch electrical power to the projectiles for telemeter activation, battery charging and temperature stabilization via the required four-wire arrangement. The unmanned module in turn is suitably electrically connected to a manned module control center.

BRIEF DESCRIPTION OF THE DRAWINGS

The above-mentioned and other objects, advantages and features of the invention will become apparent, and the invention more fully understood, with reference to the following detailed description taken in conjunction with the accompanying drawings, in which.

DETAILED DESCRIPTION

Figure 1:
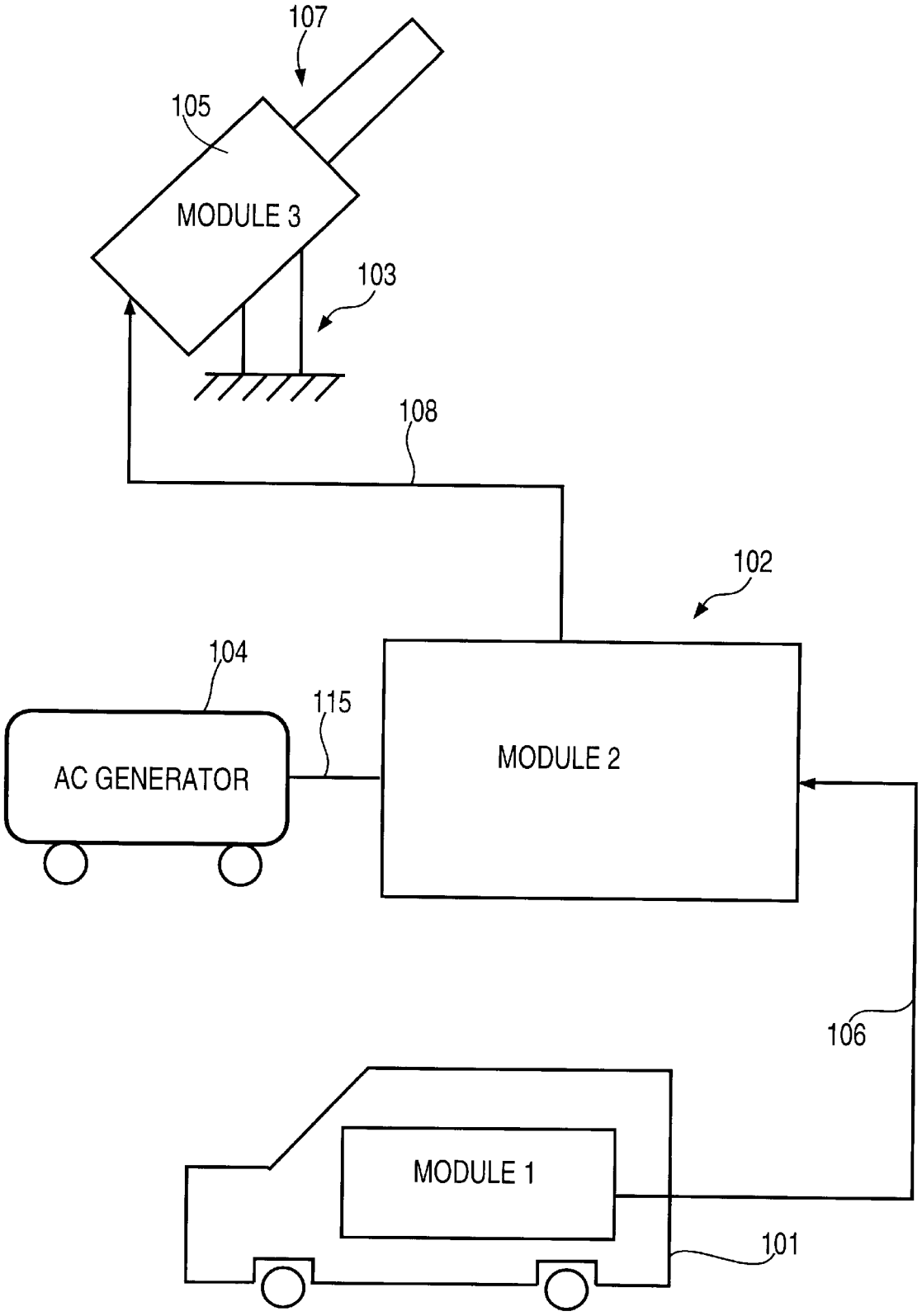
FIG. 1 is a schematic block diagram illustrating a 3-module arrangement of telemetry controller according to the invention.

FIG. 1 illustrates in block diagram form the telemetry control arrangement according to the invention, as embodied in a 3-module system presentation. Module 1 is associated with a manned telemetry van 101 located at the safe distance of at least 1,000 feet from the projectile (e.g., rocket) launch pad 103. Module 2 constitutes an unmanned intermediate stage 102, located perhaps fifty feet from the launch pad 103.

Associated with intermediate stage 102 is an AC generator 104 which supplies power to module 2 and through same to the module 3 arrangement 105 incorporated into each of the respective test projectiles to be launched from the pad area 103. The AC generator 104 is conventionally connected to the module 2 circuitry by suitable electrical cable 115. Module 2 is also coupled to the remotely located telemetry van 101 via appropriate control wiring 106 which terminates at module 2 with suitable optical coupling (not particularly shown in FIG. 1) to eliminate spurious interference.

Control signals and power are passed from module 2 simultaneously to each of the module 3 circuits respectively associated with the thirty or so rockets to be test fired from the rocket launcher 107 situated at the launch pad 103. Power and control signals arrive at the launch site via a four-wire cable 108, which terminates in an existing umbilical hook-up arrangement (not particularly shown in FIG. 1) that allows the power and control signals to reach each test projectile through the base of each respective launch tube of the rocket launcher 107 when the rocket is appropriately loaded into its tube.

Figure 2:
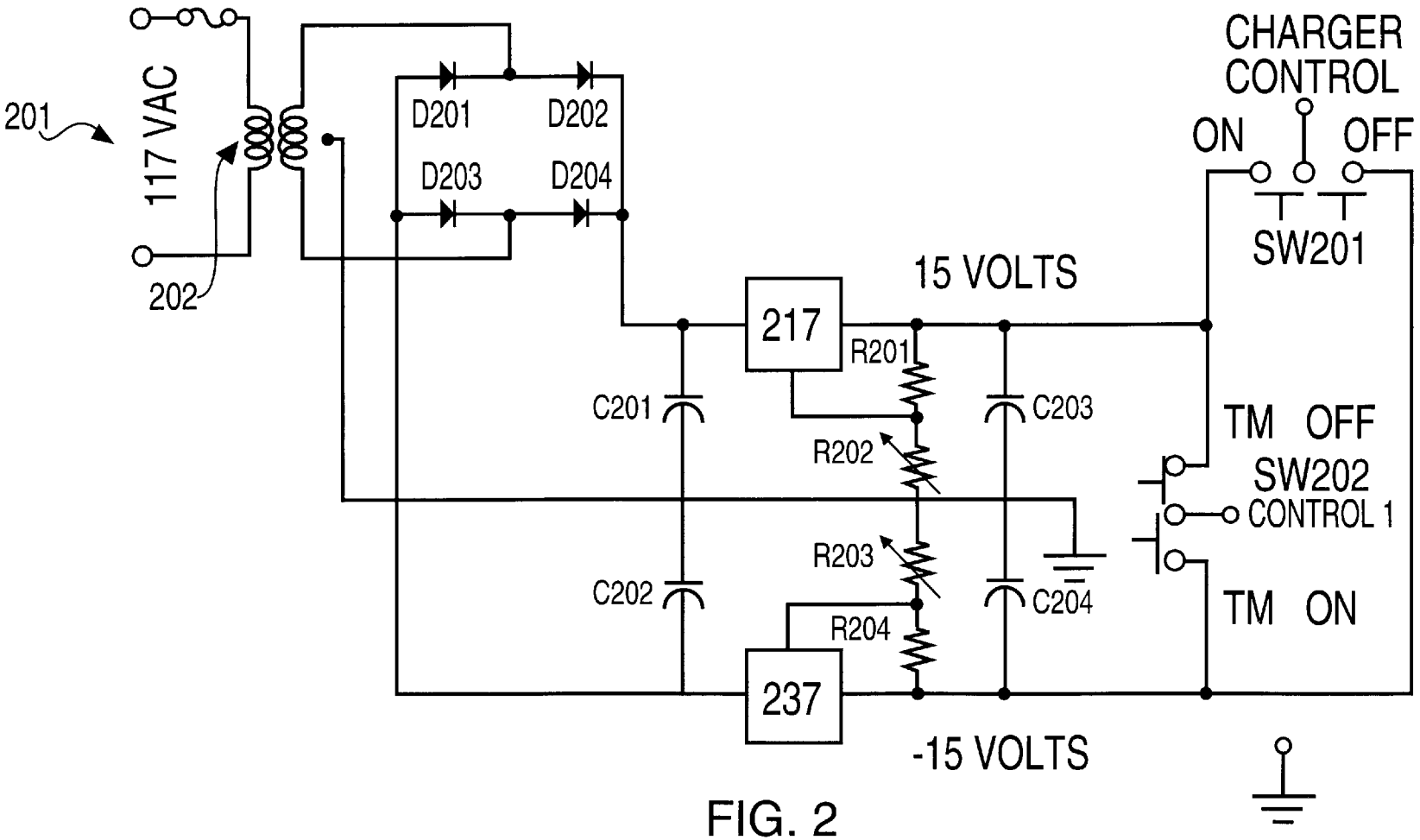
FIG. 2 is a schematic circuit diagram of module 1 of the telemetry controller.

The module 1 circuitry is illustrated in the schematic diagram of FIG. 2, wherein a battery charger and heater circuit signal, on the one hand, and a telemetry control signal, on the other hand, are developed from a conventional AC power source.

Figure 4A:
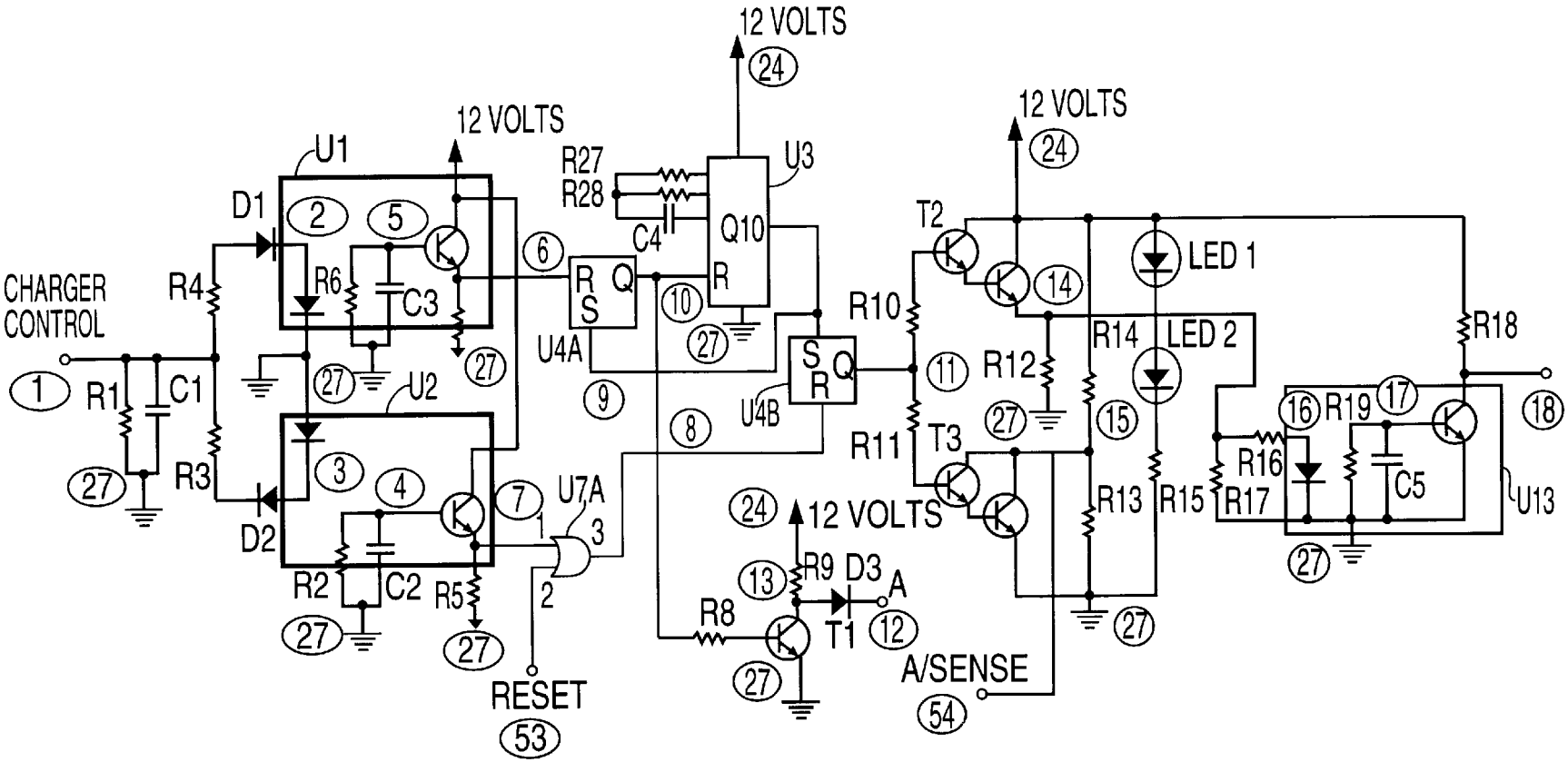
FIGS. 4A–4C are schematic circuit diagrams illustrating logic sections of module 2 comprising the charger control and telemeter control input circuitry.
Figure 4B:
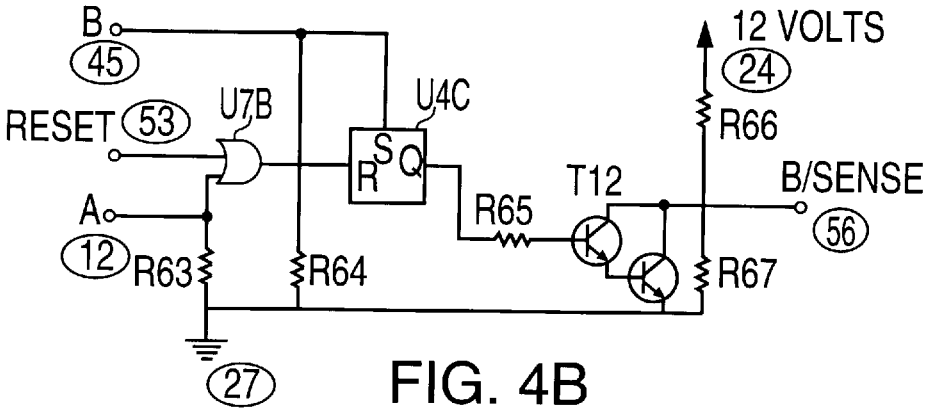
Figure 4C:
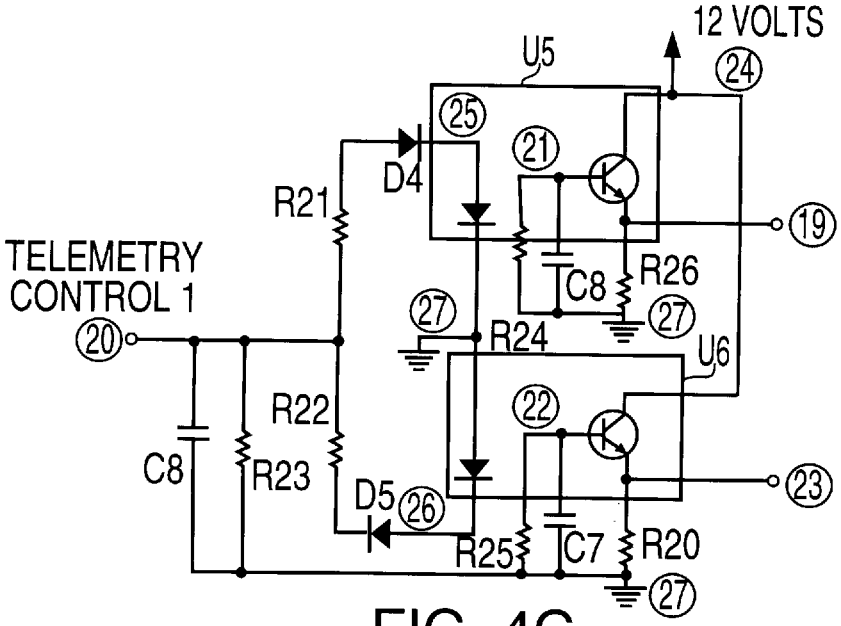

Module 1 is designed to provide signals associated with the battery charger control and with the telemeter "control 1" communication point of module 2 (node 20 of FIG. 4C). This circuitry contains an AC power converter, a dual power supply and manual switches for the charger and control 1 telemetry controls. The AC power converter provides a +20 volts and −20 volts to the dual power supply and then regulates these to +15 volts and −15 volts respectively for use in the communications link between module 1 and module 2.

AC source 201 is coupled to the signal-generating portion of the FIG. 2 circuitry via a typical power supply arrangement comprising a transformer 202 having a fused primary and a grounded center-tapped secondary. The transformer secondary is connected to a quad-diode network D201-204, the dual outputs of which together with the center tap of the transformer secondary are connected to a capacitor filer network C201-202.

The power supply outputs consist of ±20 volt sources which are respectively treated by voltage regulators 217 and 237, the latter being adjustable via respective resistive control networks R201-202 and R203-204. The resulting positive and negative 15-volt outputs are again treated by a capacitor filter network of C203-204, with the resultant output made available to a switching network consisting of battery charger control switch SW201 and telemetry control switch SW202.

As shown, each switch is capable of providing the +15 volt "ON" signal through activation of the one push button, and the −15 volt "OFF" signal upon manual actuation of the remaining button. Switches SW201 and SW202 are such that while both buttons of each switch may simultaneously reside in the "off" state, only one of the buttons may achieve the "on" position at any given time.

Module 1 is designed to provide signals associated with battery charger control of the respective batteries associated with the module 3 circuitry contained within the test rockets themselves, and also the signals associated with the telemeter control. In the latter case, the signals are associated with the telemeter control 1 communication point at the corresponding module 2 port (node 20 of FIG. 4C).

As described, this circuitry contains the alternating current power converter, dual power supply and manual switches for the (battery) charger and control 1 (telemeter) controls, where the AC power converter provides +20 volts and −20 volts to the dual supply and then regulates that to the positive and negative 15 volt outputs for use in the communication link between module 1 and module 2.

Figures 3A, 3B:
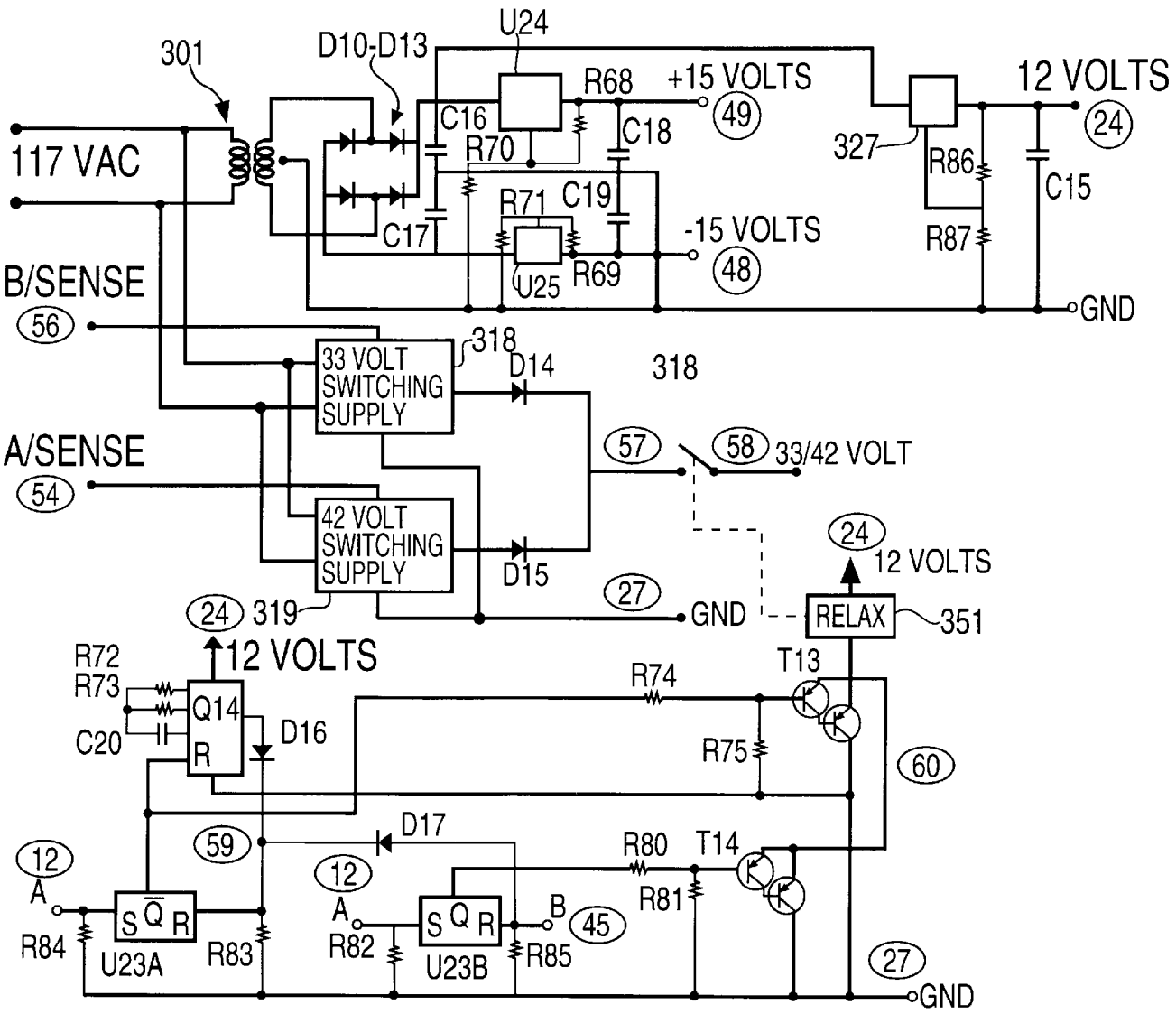
FIGS. 3A and 3B are schematic circuit diagrams illustrating respectively the power supply and supply control or timer circuitry of module 2 of the invention.
Figure 5B:
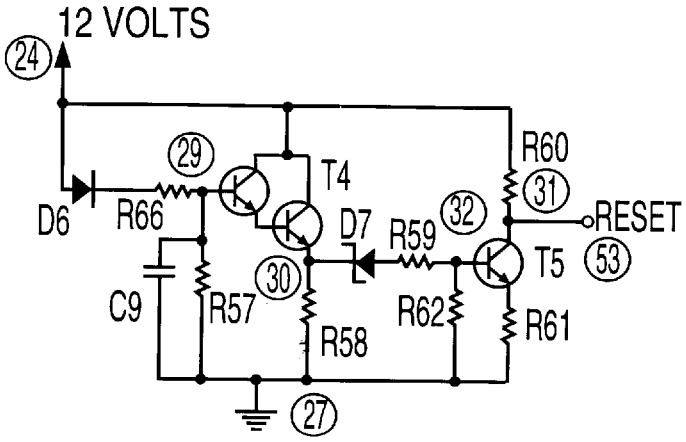
FIGS. 5A and 5B are schematic circuit diagrams illustrating additional logic sections of module 2, comprising the output amplifier stage and reset circuitry.
Figure 5A:
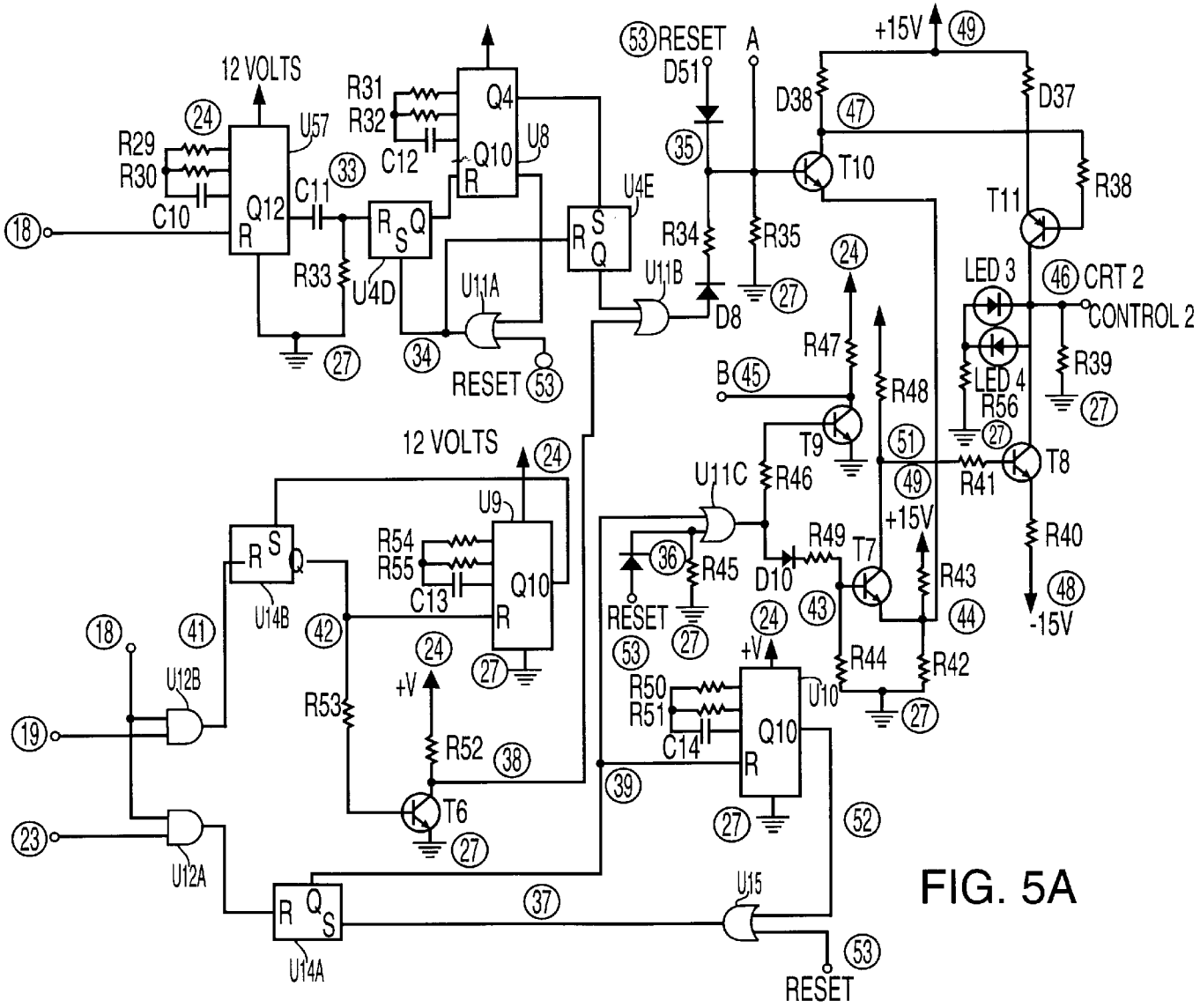
Figure 6A:
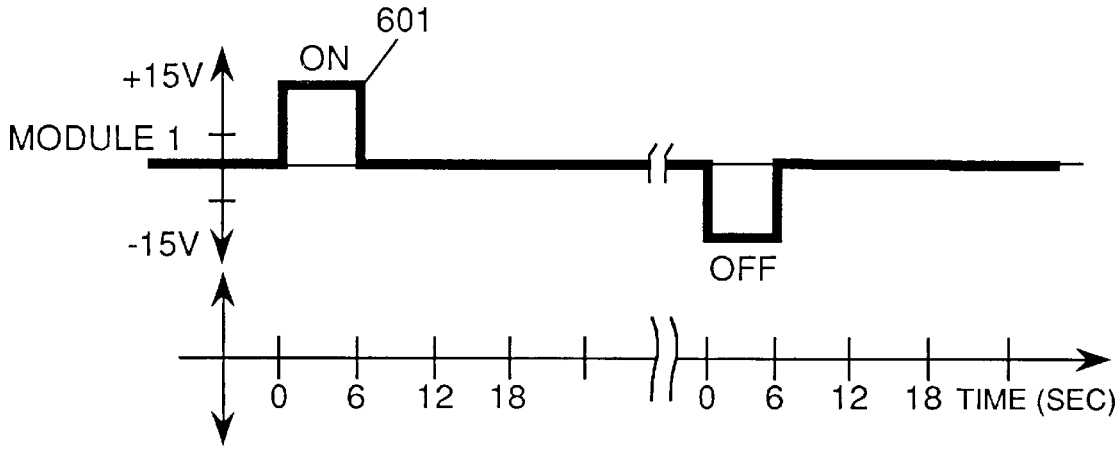
FIG. 6 having scenes A through D comprises in combination a charger function control timing diagram.
Figure 6B:
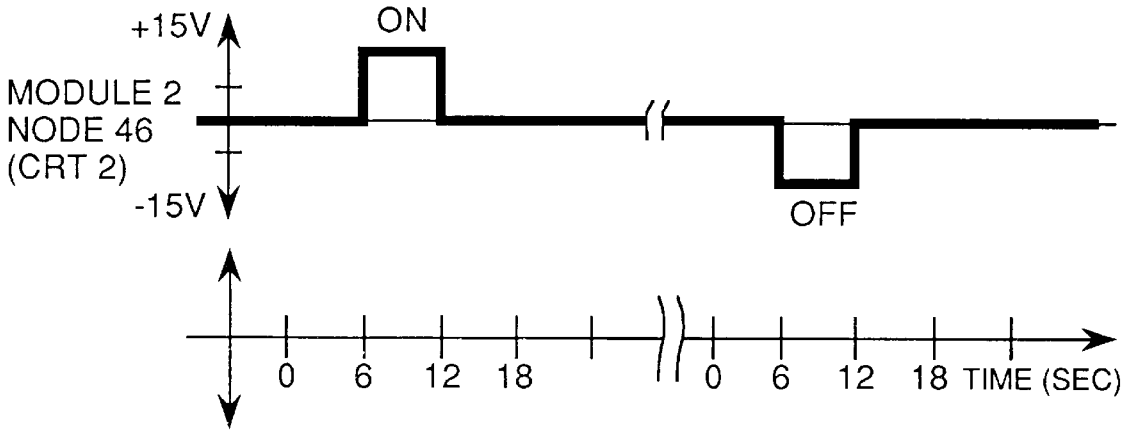
Figure 6C:
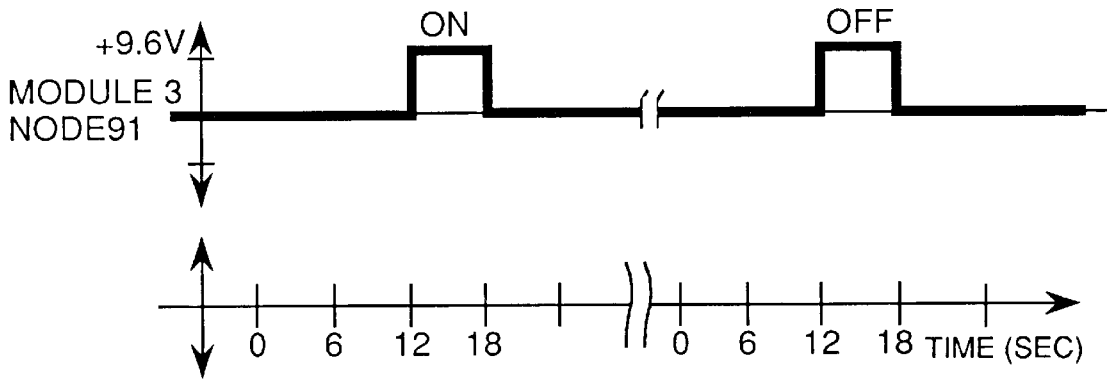
Figure 6D:
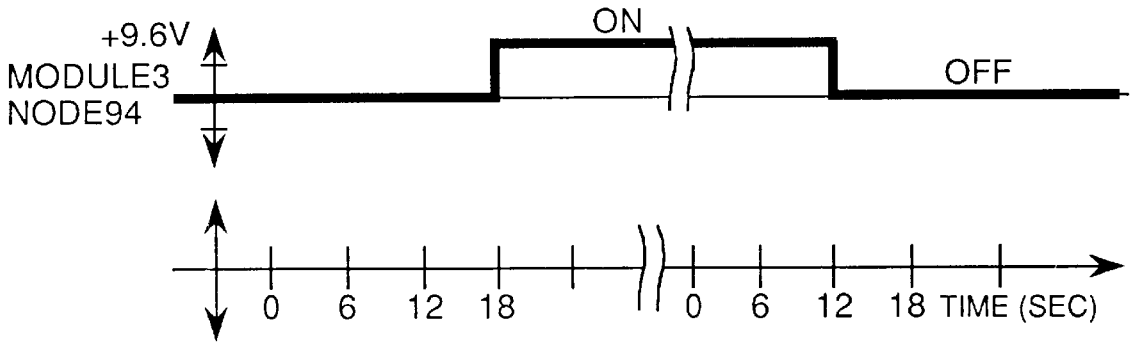
Figure 7A:
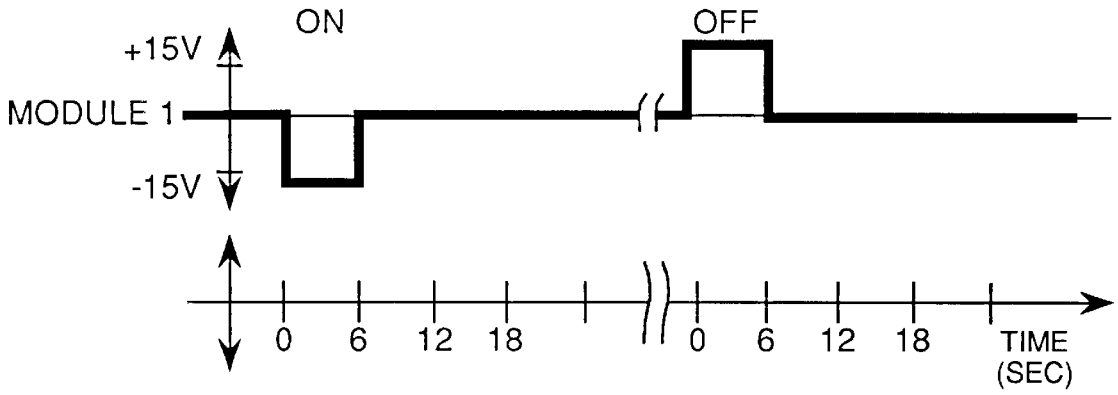
FIGS. 7, which includes scenes A through D, comprise in combination a telemetry control timing diagram.
Figure 7B:
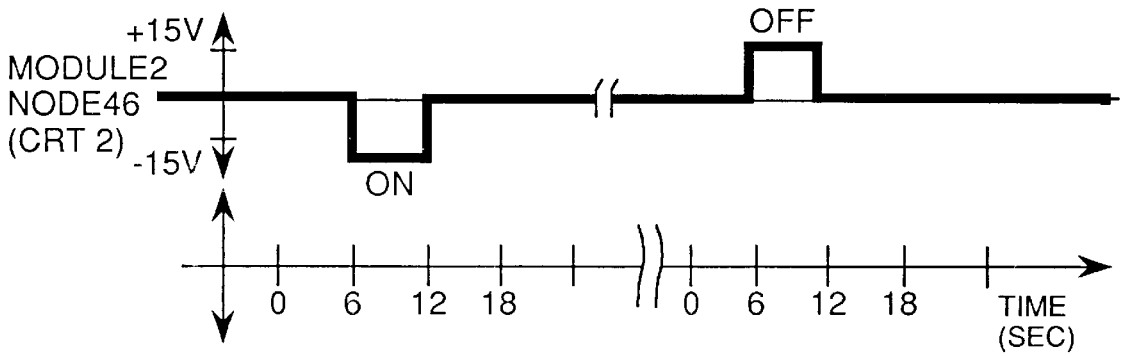
Figure 7C:
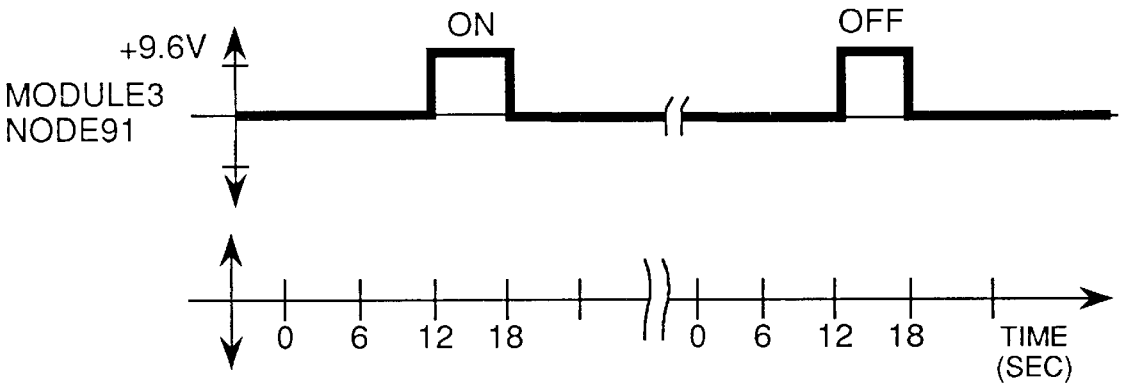
Figure 7D:
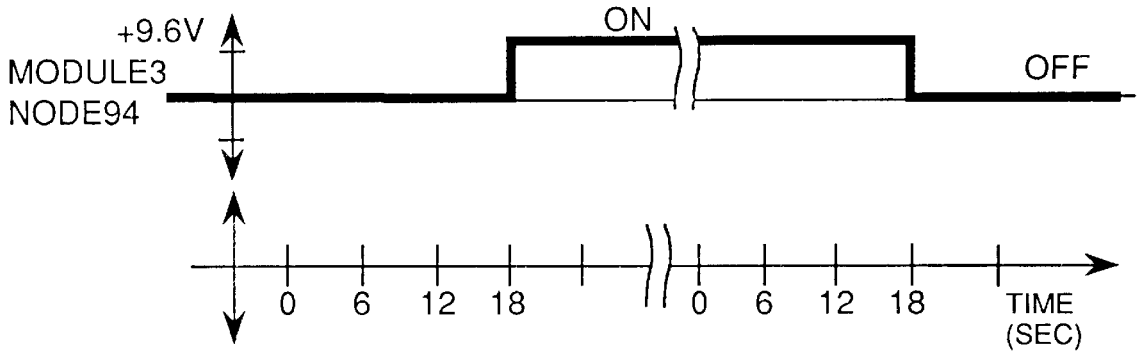

FIGS. 3A & 3B, 4A–4C and 5A & 5B depict the various circuits which comprise unmanned module 2. More particularly, FIGS. 3A and 3B illustrate in schematic diagram form the module 2 power supply and timer circuitry respectively. FIGS. 4A–4C illustrate schematically the charger control input circuitry and the telemeter control input circuitry. FIGS. 5A & 5B illustrate, also in schematic diagram form, the output amplifier stage and a reset circuit.

Reverting to FIGS. 3A & 3B, the power supply arrangement depicted in FIG. 3A is in major part quite similar to that illustrated in FIG. 2, as regards transformer 301, diode network D10–D13, capacitive filter networks C16 & C17 and C18 & C19, and voltage regulators U24 and U25, though the regulators are not provided with adjustable resistor controls as in FIG. 2. However, as is also the case in FIG. 2, dual outputs of ±15 volts are provided at nodes 49 and 48 respectively.

One additional regulated power supply output of ±24 volts is provided from the FIG. 3A arrangement at node 24, which output is derived from a tap of the ±20 volt input to regulator U24 which is processed through voltage regulator 327 in association with an RC network of R86, R87 and C15.

The lower part of the power supply of FIG. 3A comprises a dual switching supply arrangement for selectively providing at a single output terminal or node a pair of predetermined voltages, in this case, ±33 and ±42 volts. This dual power switching supply arrangement is governed first by a pair of inputs, A/SENSE and B/SENSE, and its output is controlled by a relay switching device, which in turn constitutes the operative output of the timer circuit of FIG. 3B.

In FIG. 3A, the A/SENSE input, also known as node 54 of FIG. 4A, is connected to the 42-volt switching supply 319. The +42 v output of supply 319 is treated by rectifier diode D15 and passes to common node 57 and therefrom through the controlled switch portion of relay 351 of FIG. 3B to output node 58.

Similarly, the B/SENSE input, also known as node 56 of FIG. 4B, is connected to the +33-volt switching supply 318. This supply's output is treated by diode D14 and passes to common node 57 and through relay switch 351 to output node 58.

FIG. 3B illustrates schematically the timer circuit of module 2. The circuit is comprised of a pair of flip-flops U23A & U23B, each having as its input the node 12 output (also identified as lead "A") of FIG. 4A. In the case of flip-flop U23A, its Q output is tied to a ripple counter U26, whose output is connected through diode D16 to node 59 and the reset of flip-flop U23A. Node 59 in turn is coupled through a second diode D17 to the reset of flip-flop U23B and output node 45, the latter also being identified as lead B.

The Q terminals of FF's U23A and U23B are connected to respective transistor arrangements T13 and T14 having common a output at node 60 which in turn forms the input of relay 351.

FIG. 4A schematically illustrates the battery charger control input circuitry of module 2. The charger control signal from module 1 is input at node 1 and passes through an RC network of R1, R3, R4 and C1 and diode inputs D1 and D2 to respective optocouplers U1 and U2. The output of optocoupler U1 is connected to the reset of a flip-flop U4A and the corresponding output of optocoupler U2 is coupled to the reset of flip-flop U4B via OR gate arrangement U7A.

The Q terminal of FF U4A is on the one hand connected to ripple counter U3 and on the other hand to a transistor stage T1 and through output diode D3 to the aforementioned A lead output at node 12.

The ripple counter U3 output is connected to the common connection of the S terminals of FF's U4A and U4B, the latter having its Q terminal split through resistor network R10 and R11 to drive respective transistor circuits T2 and T3. The operative output of circuit T2 at node 14 is coupled between a pair of indicators LED 1 and LED2 and on through optocoupler U13 to charger control output node 18.

The transistor circuit T3 output constitutes the A/SENSE signal at node 54 and is further coupled to the dual LED arrangement via resistor network R13 and R14.

The circuit of FIG. 4B provides the B/SENSE signal at node 56, in response to appropriate input present at node 12 (point A) and node 45 (point B), The latter is connected to the S terminal of a flip-flop U4C and the former connected through an OR gate U7B to the reset of FF U4C.

The Q terminal of FF U4C is in turn coupled to a transistor circuit T12 whose output represents the B/SENSE signal.

FIG. 4C schematically illustrates the telemeter control input circuitry of module 2. Its function is governed by the telemetry control 1 input at node 20. Passing through an RC network of R21, R22, R23 and C8, this input is split to provide dual inputs to respective optocouplers U5 and U6. Couplers U5 and U6 are essentially identical circuits with the exception of the polarity of the diodes D4 and D5 respectively coupling the split control paths of the aforementioned RC network to the optocouplers. The outputs of couplers U5 and U6 become respectively the output signals of nodes 19 and 23.

FIG. 5A depicts the important output amplifier circuitry of module 2, leading to the control 2 output signal at node CRT2. The input node 18 signal, representing the output of the charger control input circuitry of FIG. 4A, on the one hand, and the node 19 and node 23 signals, representing the outputs of the telemeter control input circuitry of FIG. 4C, on the other hand, effectively comprise the inputs to this amplifier section.

The charge control input at node 18 is connected to the reset of a ripple counter U57 which in turn is coupled through an RC network of R33 and C11 to a flip-flop U4D. The Q terminal thereof is connected to the reset of a second ripple counter U8, which in turn is connected on the one hand to the S terminal of flip-flop U4E and through gate U11A to the S terminal of FF U4D.

The Q terminal of FF U4E is coupled through gate U11B and a diode/resistor combination comprising Diodes D8 and D51 and Resistors R34 and R35, to transistor stage T10. The aforementioned diode-resistor combination also allows for an input of the lead A signal at node 12 (FIG. 4A) to the base of transistor T10. The collector of T10 is fed through resistor R38 to the base of a transistor T11 whose output is connected to a dual LED indicator arrangement LED3 and LED4, and constitutes the direct control 2 output signal at node CRT2 (also node 46).

The circuitry of FIG. 5A also receives the node 19 and 23 outputs of the telemeter control input circuitry (FIG. 4C) at respective inputs of AND gates U12B and U12A. The other input to these AND gates is the charger control output from node 18 of FIG. 4A. The outputs of AND gates U12B and U12A are connected to the reset of respective flip-flops U14B and U14A. The Q terminal of FF U14B is coupled at node 42 to the reset of a ripple counter U9, whose Q terminal is in turn tied to the S terminal of said FF U14B. Node 42 becomes the input of a transistor stage T6 whose output at node 38 constitutes a second input to the aforementioned OR gate U11B of FIG. 5A.

In similar fashion, The Q terminal of FF U14A becomes node 39 which is connected to the reset of a ripple counter U10, whose Q terminal is coupled through an OR gate U15 to the S terminal of FF U14A. Node 39 leads through a gate arrangement comprising OR gate U11C to become the split input to a pair of transistors T7 and T9. The output of stage T9 is the lead "B" signal at node 45, made available to the input of FIG. 4B. The emitter of transistor stage T7 is coupled to the −15 v regulated supply, via node 51, while the T7 collector is coupled to the +15 v regulated supply, via node 44, as shown. Node 44 also leads to the emitter of the aforementioned transistor stage T10, whereas node 51 is coupled to the input of amplifier stage T8 whose collector output is common with the collector of the afore-mentioned T11 stage.

FIG. 5B depicts schematically a reset network providing an output reset signal at node 53, available to FIGS. 4A, 4B and 5A. The reset circuit of FIG. 5B is operated with the regulated +12 v supply provided by the power supply circuitry of FIG. 3A at node 24. FIG. 5B comprises a transistor combination T4 which is coupled through zener diode D7 and a resistor network of R59 and R62 to a second transistor stage T5 the output of which constitutes the reset signal at node 53.

Module 2 is designed to operate as a relay station between the mobile receiving station (i.e., the van housing module 1) and module 3 which is located at the launch site and physically within the payload or test projectile. The principal objective of module 2 is to receive two types of signals from module 1 and output the same two types of signals, but synchronized with the necessary DC power levels to operate module 3.

As considered previously, the two types of signals transmitted from the receiving station (module 1) are the charger control and the telemetry on-and-off control. The charger control at module 2 (node 1, FIG. 4A) recognizes two voltage levels: +15 volts which turns on the battery charger and −15 volts which turns off the battery charger.

The telemetry on-and-off control input (node 20, FIG. 4C) also recognizes two voltage levels, +15 volts which turns off the telemetry and −15 volts which turns on the telemetry. Concurrently with these two functions, i.e., charging the batteries contained in the test rockets and powering on and off module 3 and thus the telemetry, the circuitry in module 2 is designed to apply the necessary DC voltage levels, synchronizing these levels with the battery charging control and the telemetry power supplies through the A/SENSE (node 54 of FIG. 4A) and B/SENSE (node 56 of FIG. 4B) points.

The electronic signals at these points allows the switching power supplies 318 and 319 to be turned on and off in synchronization with their respective functions. The output from the power supplies is passed through a timer which is enabled by the charger control and disabled by the telemetry on/off control. This timer establishes a sixteen-hour charging cycle for the rechargeable batteries of module 3.

As described hereinabove, the circuitry in module 2 is essentially comprised of five functional sections: the telemeter control (TM control 1) input circuit of FIG. 4C; the charger control input circuit of FIG. 4A; the reset circuit of FIG. 5B; the output amplifier of FIG. 5A; and the FIG. 3B timer circuit.

The Module 2 section communicates with module 1 through three wires. This first set of communication points constitutes: the charger control, the TM control 1 and a common ground. Similarly, module 2 communicates with module 3 through three wires. This second set of communication points constitutes: the control 2 point (CRT2) at node 46 (FIG. 5A), the external power point at node 58 (FIG. 3A), and a common ground.

The circumstances governing the existing situation which led to the present invention require that the control 2 (CRT2) output be capable of producing both positive 15 volts and negative 15 volts over a single wire and ground. Three wires constituted the maximum allowed communication link to/at module 3.

The module 2 circuitry controls and prioritizes the traffic of control signals and external power between module 1 and module 3. At the top of the priority list, the charger input (node 1, FIG. 4A) determines if the TM control 1 (Node 20, FIG. 4C) is either abled or disabled. This decision is determined by node 18 (the FIG. 4A output) which is the output of optocoupler U13.

Because the status of node 18 determines the priority of the commands sent out to module 3, this discussion begins with the description of module 2 design at the charger control input (node 1, FIG. 4A) . When a +15 volt pulse 601 (FIG. 6) with a duration of six seconds is applied to node 1, optocoupler U1 provides a +9.6 v pulse at node 6. This causes the output of flip-flop U4A to assume a low voltage level (zero volts) and reset ripple counter U3 which in turn resets the same FF U4A in six seconds via node 9.

The resulting pulse provides the necessary six-second pulse at node 12 (lead A). The output of the ripple counter U3 also provides a high voltage level (+9.6 volts) at node 11, which derives a low level signal at A/SENSE node 54 (FIG. 4A) to turn on the +42 v switching power supply 319 (FIG. 3A).

Node 11 of FIG. 4A also provides a high voltage level at node 14 to produce a low voltage level at output node 18. When a low voltage level is present at node 18, a high voltage level is present at A/SENSE node 54 which turns on the LED indicator LED2 and the +42 v switching supply 319 of FIG. 3A respectively.

The 42 volt supply, which is used to recharge the batteries in module 3, appears at node 57. During the charging cycle, the +42 v supply output is intercepted by the timer circuitry, and in particular by switching relay 351 of FIG. 3B. The timing is initiated when the aforementioned six-second pulse at lead A (node 12) appears at the S terminal of flip-flops U23 (FIG. 3B). The sixteen-hour charging cycle timing function is generated by the ripple counter U26 at node 59. This node remains at a low voltage level for the entire sixteen hours of battery charging, and assumes a high voltage level at the completion of the charging cycle, thus disconnecting node 57 from node 58 in FIG. 3A via switch relay 351, and terminating the battery charging cycle.

It has been established that the charging function establishes priority of operation over all other functions of module 2. Once the charging cycle is terminated, the circuitry is then ready to send out the appropriate signals to turn the telementry (module 3) on and off.

When a negative 15 volts is applied to node 20 (FIG. 4C), a +12 v pulse appears at node 23 and is passed through gate U12A (FIG. 5A) to reset flip-flop U14A. The output of FF U14A resets ripple counter U10 to initiate the pulse which is processed by the output amplifier of FIG. 5A and communicated to module 3 through node 46 (point CRT2).

The previous sequence of events turns the communications equipment on by sending a −15 v pulse synchronized with a DC output of +33 volts at the external power input at node 1 and node 58 respectively.

To turn the telementry off, a +15-volt pulse is applied at node 20 of FIG. 4C which results in a +12-volt pulse at output node 19. This pulse resets flip-flop U14B at node 41 (FIG. 5A) and in conjunction with ripple counter U9 a six-second, +12 v pulse appears at node 38. This pulse is processed by the output amplifier stage of FIG. 5A and communicates to module 3 through node 46. This sequence of events turns the communications equipment off by sending a +15-volt pulse and turning the 33-volt power supply off concurrently.

Figure 8:
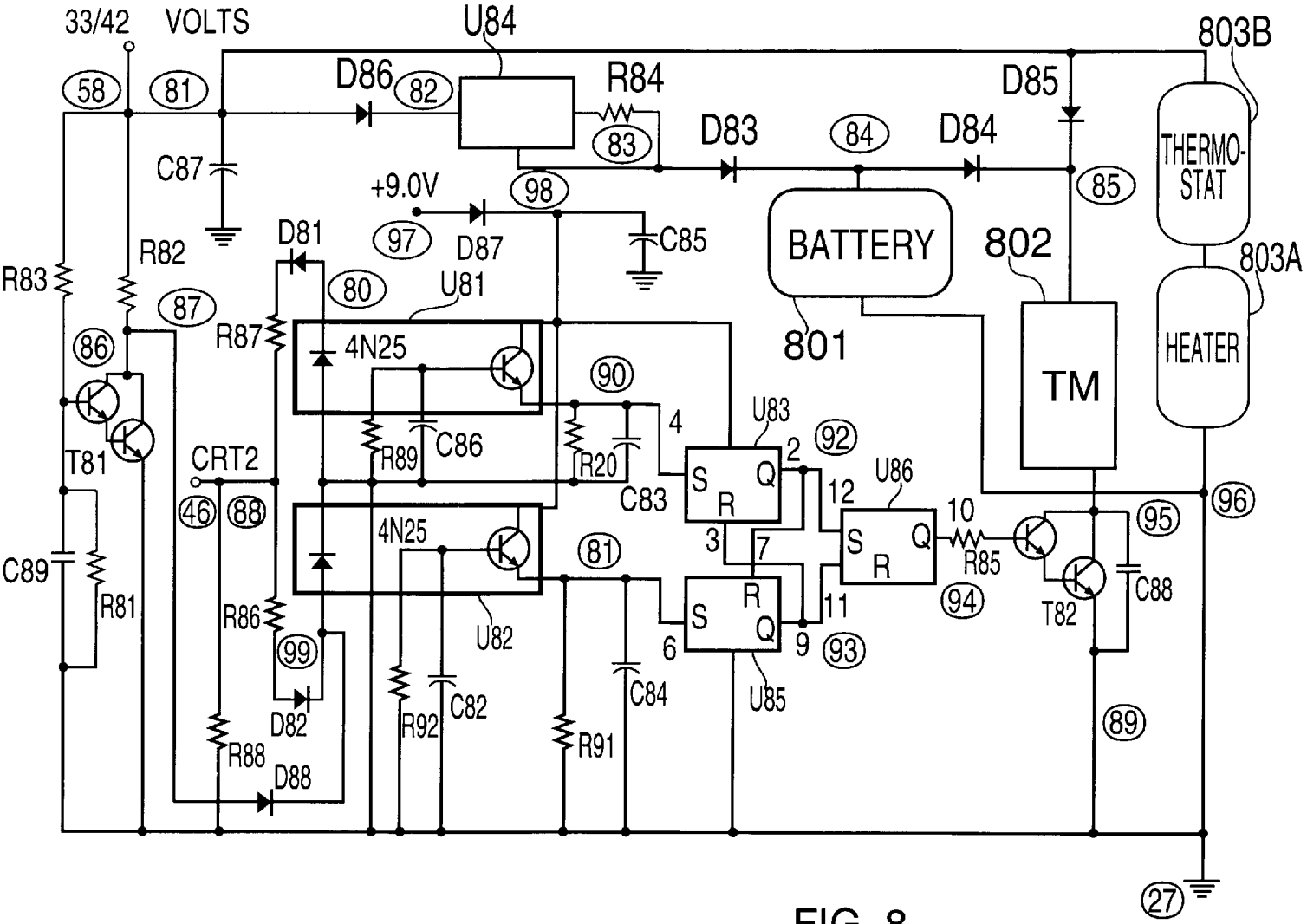
FIG. 8 is a schematic circuit diagram of the high-G telemetry control circuitry of module 3 according to the invention.

Referring to FIG. 8, the TM (telemetry) control circuit (module 3) is designed to operate as a solid state switch, battery charger and power management controller. The electronics in module 3 are specifically constructed and packaged to survive firing accelerations at the launcher in excess of 100,000 G's.

The principal objective for devising the power control system according to the invention is to install the capability to operate the test projectile instrumentation remotely, i.e., safely yet reliably remote from the launch site per se. This capability, as mentioned, has the immediate benefit of preserving and increasing the instrumentation's battery life and providing a unique capability of recharging the telemetry batteries without removing the instrumentation from the weapons system or handling the test rockets in any way once originally loaded into the launcher.

An outstanding benefit gained by this approach, and a major goal accomplished by this invention through the TM control circuitry, is a substantial increase in the safety factor with regard to the gun crew and the instrumentation field personnel.

This is in contrast to the situation and circumstances existing prior to the invention, wherein the instrumentation used in the testing of new modern weapons was operated at the weapon loading location. Such operation included turning the telementry on and off and conditioning the battery. There, the on/off operation was performed by turning a mechanical screw and making contact with two surfaces, thus completing the circuit. To condition (i.e., charge) the batteries, a power supply was applied to two external pins for sixteen hours.

Because this function was performed at the weapons loading site, it was considered by safety personnel to be a potentially very dangerous operation. Furthermore, the instrumentation batteries could only store electrical energy to operate the communications equipment for approximately fifteen to twenty minutes after the mechanical screw connection was effected. Typically, the process of loading the test projectiles for firing at the proving grounds (i.e., launch site) took as long as two hours. Thus the loading process time easily exceeded the available battery time for the first units activated in the loading process.

It became necessary, therefore, for the instrumentation personnel have remote control over the battery charging and the telementry on/off switching. Module 3 accomplishes these needs in a compact solution, within the very test rounds themselves, for all of the problems and complexities associated with the loading of the weapons system, and maintaining the telemetry before, during and following firing of the test projectiles, and especially with regard to the safety of all personnel involved.

The circuitry of module 3 is depicted in FIG. 8. It is supported by modules 1 and 2, which are electrically linked to module 3 via the aforementioned three-wire arrangement.

Reverting to FIG. 8, the 33/42 volt supply from the circuitry of FIG. 3A is input to the telemetry (TM) control circuit via node 58, which in turn is made available to several parts of the control circuitry. The first of these is the test projectile battery 801, which is electrically coupled to the source through voltage regulator U84 and diodes D83 and D86. The second is to the telemetry itself, shown in FIG. 8 in block form as TM circuit 802. In this instance, the node 58 source is available to the telemetry 802 via diode D85. Thirdly, the node 58 source is connected, directly, to a heater/thermostat arrangement 803A and 803B. Finally, the node 58 source is available to the input transistor stage T81 of the telemetry control.

Input transistor stage T81 is connected through diode 88 and node 99 to optical coupler U82, the output of which at node 91 is fed to the S terminal of flip-flop U85.

The principal input to the telemetry circuitry of FIG. 8 is the control (CRT 2) signal from node 46 of Fig, 5A. This signal is coupled through respective resistor/diode networks R87/D81 and R86/D82, the respective outputs of which are connected to an optical coupler. In the case of resistor/diode combination R87/D81, this connection constitutes node 80 and the input of optocoupler U81; for R86/D82, this connection constitutes node 99 and the input to optocoupler U82. The resistor/diode combination of R87/D81 has the diode arranged in reverse polarity to that of the R86/D82 combination. Optocoupler U81 and optocoupler U82 are each coupled via respective RC networks to the S terminal of a flip-flop, with FF U83 associated with coupler U81 and FF U85 associated with coupler U82. In addition, optical couplers U81 and U82 as well as FF U83 are connected to a positive 9-volt source via diode D87 and node 98. The positive nine volts at node 17 is derived from the battery on board the telemetry circuitry. When the projectile is in flight, the +9 v supply is used to operate the TM control circuit.

The Q terminals of the FF's U83 and U85 are tied to the reset of another flip-flop U86. Also, the Q terminal of FF U83, constituting node 92, is connected to the S terminal of flip-flop U86, whereas, the Q terminal of FF U85, constituting node 93, is connected to the reset of FF U86.

This particular arrangement guarantees that the FF U86 can only be in one state at any particular time, and accordingly the voltage level at the Q terminal (node 94) of FF U86 will remain in its selected state until positively switched by the combination of inputs at node 58 and CRT2.

The voltage level existing at node 94 is input to a transistor stage T82 which in turn is connected to the telemetry circuitry 802.

The circuitry in module 3 is comprised of five functional sections: (1) a reset circuit which assures that the FF U86 output at node 94 is always at a low level (0 volts) when the power at node 81 (i.e., also node 58 constituting the 33/42-volt supply) is turned on; (2) an optically coupled +15 volt/−15 volt input; (3) a bistate device, comprising FF's U83, U85 and U86; (4) a solid state high power transistor switch T82; and (5) an on-board (i.e., the test projectile) battery charger.

The reset circuit insures that the telemetry unit will be maintained off when the voltage at node 81 is either 33 volts or 42 volts. The optically coupled +15 v/−15 v control input is completely isolated from the world outside the test projectile, thus rendering this module insensitive to noise as to the control signal.

The bi-state device U83, U85 and U86 transforms a pulse signal into a continuous signal to turn the solid state switch T82 on or off. Solid state switch T82 in turn activates or deactivates the instrumentation by completing the ground (node 89 or 27). Finally, the on-board battery charger is designed to provide constant current to condition the rechargable batteries via remote operation.

To provide further assurance that the communications equipment will not turn on during the battery charging cycle, module 2 applies a +15-volt pulse for six seconds every four minutes. This function will prevent damage to the communications equipment due to overheating if the module 3 solid state switch somehow is turned on due to random noise. It will also maintain the communications equipment in an off state 100% of the time during the charging cycle.

The charging cycle is controlled by module 2; however, the circuitry which delivers the proper charging amount of current is built into module 3. The charging current is programmed into the regulator U84 and it is set at 10% of the full capacity of the internal battery for a period of sixteen hours.

Module 3 is a system which is operated in three modes. Mode 1 is identified as a battery conditioning (charging) operating mode, which occurs when 42 volts are applied to node 81. Mode 2 allows the telemetry instrumentation to be turned on and off, and it occurs when 33 volts are applied at node 81 with either +15 volts or −15 volts being applied at the telemetry control input CRT2 (node 46). A +15 volt pulse results in turning the instrumentation off and a −15 volt pulse results in turning the instrumentation on. Mode 3 is a standby mode which requires the circuitry in module 3 to consume less than 10 nanoamperes at a voltage supply of ten volts. This requirement is aimed at saving battery energy during long periods of the standby operation mode, to be used in the stockpiling of rounds.

Reverting further to FIG. 8, in mode 1, the Transistor stage T81 outputs a +42 v pulse for approximately six seconds. This assures that transistor stage T82 maintains an open ground connection to the on-board communications equipment. Concurrently the CRT2 control input has been inhibited by the circuitry in module 2 (FIG. 5A) from achieving a low voltage level (i.e., −15 volts).

The second mode of operation for the instrumentation control circuitry of FIG. 8 is to turn the communications on and off using a −15 v pulse and +15 v pulse respectively. The uniqueness of the TM control circuitry is defined at least in part by the requirements imposed on the design thereof. It is designed with a maximum of three wires connecting this circuitry with module 2. These three wires control all five of the within-mentioned functions, using a common ground, at node 89, an external power input at node 81, and the control wire CRT2 input at node 88 (also node 46), which latter wire carries both the +15 volts and the −15 volts.

Furthermore, the TM control circuit is designed with a reset circuit (transistor stage T81), to assure the communications telemetry continues to remain turned-off during the power turn-on stabilization. This reset function insures that the output of the latch circuit, consisting of the flip-flops U83, U85 and U86, at node 94, is initialized to a low state when the power at node 81 is turned on.

Another design requirement is to provide superior noise isolation between the latch circuitry and the external world. This has been accomplished by employing optocouplers U81 and U82, each dedicated to the two major missions of interpreting the +15 volts and the −15 volts. By the word "interpreting" is meant the optocouplers U81 and U82 discerning the actual voltage reaching at least ten volts (positive or negative) with a duration of six seconds (see FIG. 7).

When a +15 v pulse with these characteristics occurs at node 88 (CRT2, FIG. 8), optocoupler U82 produces a +9.6 volt pulse having a duration of six seconds at node 91. This pulse causes the latch circuit to produce a low state at node 94, which in turn maintains transistor stage T82 in the shut-off mode. The foregoing, initiated with a +15 v pulse at the CRT2 input thus shuts the communications equipment 802 off.

A further series of events, initiated by a −15 v pulse at the CRT2 input, will turn the telementry 802 on. When a −15 v pulse of six seconds in duration occurs at node 88, optocoupler U81 produces a +9.6 v pulse at node 90, which causes the latch circuit to produce only one high state at node 94. When node 94 is charged with this +9.6 volts, the transistor stage T82 behaves like an "on" switch which activates the instrumentation 802.

The design uniqueness of the optocoupler/latch combination is itself noteworthy. Notwithstanding, the optical coupler stages employ the additional design feature of capacitors C82 and C86, which advantageously affect the operation of the respective optocouplers. When, for example, optical coupler U81 receives the +15 v pulse, its internal diode illuminates the base of its internal transistor. When +9.6 v is applied to the collector of the internal transistor, its emitter outputs a +9 v pulse at node 90. The delay between the +15 v pulse and the +9 v pulse is altered by introducing the capacitor C6 at the base of the internal transistor. This capacitor demands that the input pulse be six seconds in duration in order to allow the output at node 90 to assume a high state of 9 volts.

Another design requirement controlled by the input optocouplers is the limitation of the input pulse to an amplitude of ten volts before a transition occurs. The 10-volt minimum amplitude is established by the particular value given to resistors R86 and R87 respectively, so that the optocoupler internal diodes only produce sufficient illumination to the base of the internal transistor between ten and fifteen volts. The foregoing two design features of the minimum amplitude of ten volts and the six-second duration, provide superior noise immunity in addition to the high isolation which the optocouplers U81 and U82 offer between module 3 and the outside world.

The arrangement of the flip-flops U83, U85 and U86, which constitute the aforementioned latch circuit, is such that only one state can be present at any one time. Each of the individual FF's has a set, a reset and an output terminal. When a positive pulse is applied to pin 4 (the "set" terminal) of FF U83, its output at pin 2 (node 92) assumes a high level. This high level is transferred to pin 7 (the reset terminal) of FF U85 and to pin 12 (the set terminal) of FF U86. The pulse at pin 7 causes the U85 output on pin 9 (at node 93) to assume a low state.

The final status of the latch circuit, U86, is then assumed to be at a high level because pin 12 is at a high level and pin 11 (the reset terminal) is given a low level. When a high level appears at pin 6, the output at pin 9 assumes a high level which is also transferred to pins 3 and 11 (the resets of FF's U83 and U86 respectively). This assures that pin 12 only has a low state and pin 11 only has a high state. The result is determined at pin 10, the output of the latch circuit. For transistor stage T82 to turn on (i.e., TM 802 ON mode), pin 10 has to supply a high level (+9 v), to the base of transistor T82. This requires that pin 12 is at a high level and pin 11 at a low level.

For Transistor stage T2 to turn off (i.e., TM 802 OFF), pin 10 has to assume a low level. This requires that pin 12 is at a low level and pin 11 is at a high level. It can be assumed 100 percent of the time, by the unique structure of the latch circuit, that pins 11 and 12 never can assume the same level, which is assured by connecting pins 2 and 7 together and pins 3 and 9 together.

What is claimed is:

1. Remotely controlled multiple-object interfacing for substantially simultaneously providing power and preselected control signals from respective power and control signals sources to predetermined ones of said objects, comprising interface means umbilically coupling said sources to said objects substantially free from spurious power sourcing and control signals; and priority means for remotely governing through said interface means the priority of application of power and control signals to said objects.

2. Remotely controlled multiple-projectile telemeter interfacing, of battery charging, battery and telemeter parameter conditioning and telemeter control within the projectiles during a period extending from pre-launch through post-launch thereof, in at least part of which period extremely high projectile acceleration gradients are experienced, comprising interface means at least a portion of which is within each projectile for providing remotely generated control signals to the projectile telemeter free from spurious triggering and interference; and priority means for remotely governing through said interface means the battery charging and battery and telemeter conditioning within a multiplicity of projectiles substantially simultaneously, and for inhibiting the receipt by the respective projectile telemeters of control signals during said charging and conditioning.

3. An arrangement according to claim 2, further including means for remotely activating said interface means, and means for remotely effecting said conditioning and therefollowing telemeter operation during the portion of said period prior to launch.

4. An arrangement according to claim 2, wherein said priority means includes means for substantially simultaneously remotely activating the telemeter of at least preselected ones of said projectiles.

5. An arrangement according to claim 2, further including means for substantially eliminating power dissipation within the projectiles prior to telemeter activation and with said charging and conditioning deactivated.

6. An arrangement according to claim 2, wherein said interface means includes credence checking circuitry for preventing activation of the telemeter absent the existence of a plurality of predetermined electronic parameters.

7. An arrangement according to claim 6, wherein said credence checking circuitry includes optocoupling means.

8. An arrangement according to claim 2, wherein said interfacing means includes remotely controlled power and control signal sources, predeterminably remotely arranged relative to said projectiles.

9. An arrangement according to claim 8, further including a manned control station remotely operatively coupled to said sources.

10. An arrangement according to claim 8, wherein said interfacing means includes optically coupled circuit means for eliminating spurious triggering signals to said power and control signal sources.

11. An arrangement according to claim 8, wherein said interfacing means includes two pairs of conductor paths operatively coupling said sources to each of said projectiles, by which said battery charging, battery and telemeter conditioning, and telemeter control are effected.

12. An arrangement according to claim 11, wherein a first one of said pairs of conductors provides power substantially simultaneously to each of the projectiles and the other of said pairs of conductors provides all control signals substantially simultaneously to the projectiles.

13. An arrangement according to claim 12, wherein said control signals include battery charging control, battery and telemeter temperature stabilizing control, and telemeter operation control.

14. An arrangement according to claim 2, wherein a portion of the interfacing means is on-board each projectile and wherein said portion includes means for electronically isolating the on-board telemeter of the projectile from the remainder of the on-board interfacing means.

15. An arrangement according to claim 4, further including an umbilical coupling arrangement for operatively coupling each projectile to said remote activating means.

16. A noise and interference immune remote controlled electronic switch, comprising optocoupler input circuitry means responsive to both positive and negative polarity signals of predetermined minimum amplitude received from a common input, coupled to latch means structured to provide one possible output state for a given input from said optocoupler circuit means.

17. A switch according to claim 16, wherein said latch means comprises a series of three flip-flop circuits, two of which constitute the input of the third flip-flop.

* * * * *